United States Patent [19]

Leege et al.

[11] Patent Number: 4,682,687
[45] Date of Patent: Jul. 28, 1987

[54] PINTLE CHAIN INCLUDING SELF-RETAINING PIN

[75] Inventors: James W. Leege, Greendale; Robert E. Stacey, Waukesha; Russell H. C. Uttke, Greendale, all of Wis.

[73] Assignee: Rexnord Inc., Brookfield, Wis.

[21] Appl. No.: 697,196

[22] Filed: Feb. 1, 1985

Related U.S. Application Data

[63] Continuation of Ser. No. 378,373, May 14, 1982, abandoned.

[51] Int. Cl.$^4$ .............................................. B65G 17/06
[52] U.S. Cl. ..................................... 198/852; 198/853
[58] Field of Search ......................... 198/853, 852, 851

[56] References Cited

U.S. PATENT DOCUMENTS

| | | | |
|---|---|---|---|
| 893,240 | 7/1908 | Hay | 198/853 |
| 2,000,499 | 5/1935 | Roland | 198/852 |
| 3,107,777 | 10/1963 | Steorts, Jr. | 198/852 |
| 4,220,052 | 9/1980 | Sheldon | 198/853 |

Primary Examiner—Joseph E. Valenza
Assistant Examiner—Lyle Kimms
Attorney, Agent, or Firm—Richard C. Ruppin

[57] ABSTRACT

A conveyor chain of the type comprising a plurality of pintle links and a plurality of pins connecting the links together. The pins have a first end which is necked-down and has a noncylindrical cross-section so as to resist rotation relative to the link, and the second end of the pin is knurled to limit axial movement.

1 Claim, 7 Drawing Figures

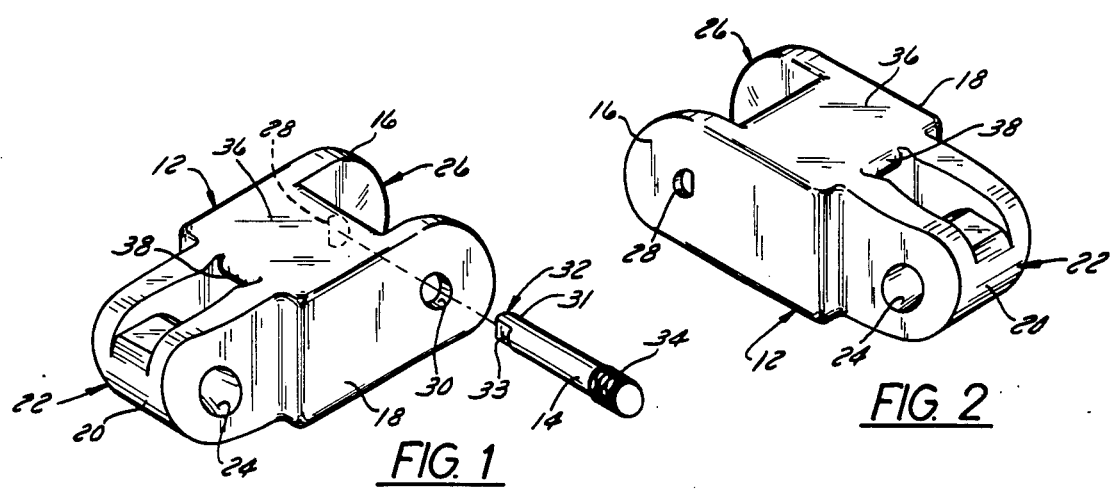
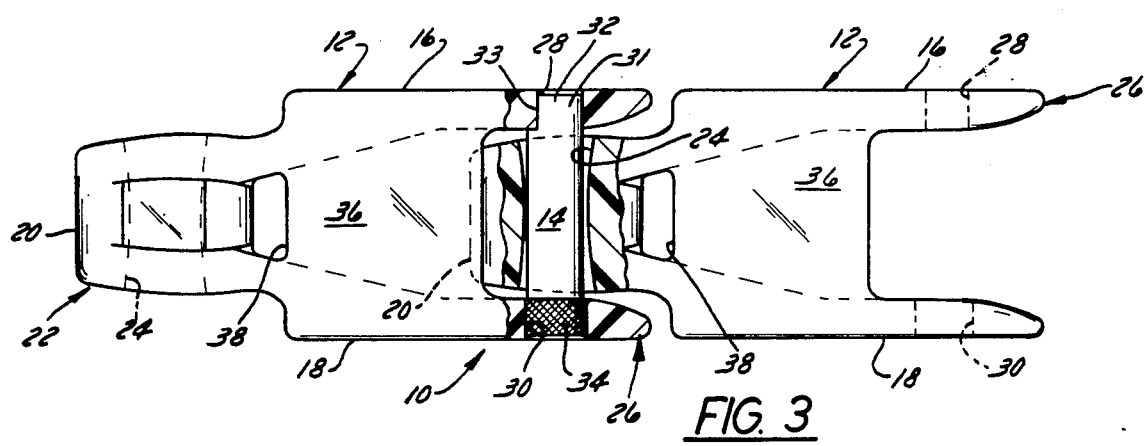
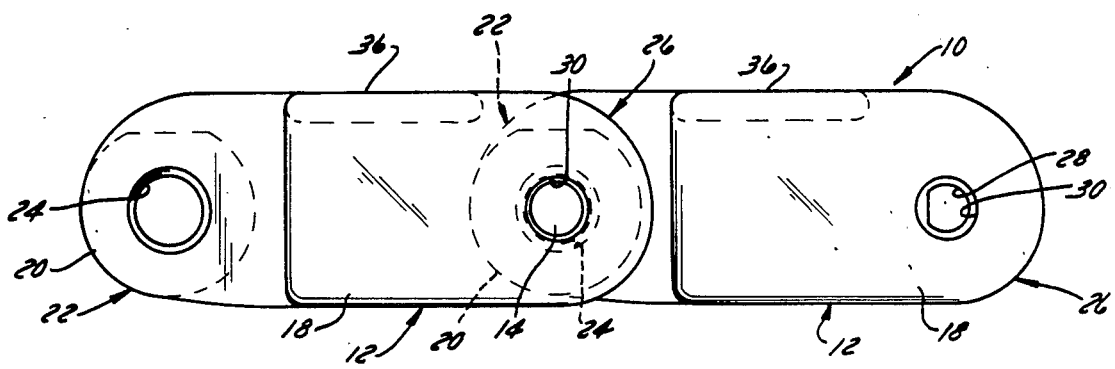
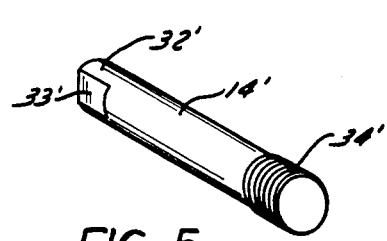

PINTLE CHAIN INCLUDING SELF-RETAINING PIN

This application is a continuation of application Ser. No. 378,373, filed May 14, 1982, now abandoned.

BACKGROUND OF THE INVENTION

This invention relates to chains, and, more particularly to pintle type conveyor chains made of a polymeric material.

Several problems have been encountered in the polymeric chains of the prior art. For example, it has been difficult to find a pin which will be retained in the link when there are forces present which tend to flex the sidebars relative to each other. There is a tendency in the chains of the prior art for the pins to work their way out of the link if the sidebars move relative to each other. Knurls have been used on one end of a chain pin in an attempt to retain the pin in the link. However, if the knurled end of the pin ever begins to turn relative to the sidebar, the knurls in the pin tend to cut into the aperture in the sidebar until the pin becomes loose.

Pins with a D-shaped cross-section have been used, but they present a problem because they reduce the cross-section of the pin throughout its length and because either the sidebars of one link or the barrel of the next adjacent link will be bearing against the flat surface portion of the pin rather than on the semicylindrical surface, thereby resulting in stress concentration at the corners of the sidebar holes, which weakens the link, or resulting in contact between the barrel and the flat surface portion of the pin, which reduces wear life.

Some of the pins of the prior art are formed by pressing a cylindrical piece of metal between dies to form it into the desired shape. This becomes more difficult as the pin becomes larger in diameter and more material has to be moved in the forming process.

Another problem encountered in pintle type links which are molded of a polymeric material is that flexing of the sidebars relative to each other tends to cause fatigue cracking in the link.

SUMMARY OF THE PRESENT INVENTION

The present invention provides a chain in which the links are held together by pins which not only retain themselves in the links but also tend to maintain rigidity of the link sidebars relative to each other.

The present invention provides a rigid link which reduces the flexing of the sidebars, thereby reducing the opportunity for fatigue failure.

The present invention also provides a pin which can be relatively easily manufactured, even in large-diameter sizes.

The present invention also provides a pin which has no head and therefore will not protrude beyond the links even though the sidebars of the link are not recessed.

BRIEF DESCRIPTION OF THE DRAWINGS

FIG. 1 is a perspective view of a chain link and pin made in accordance with the present invention.

FIG. 2 is a perspective view showing the other side of the link of FIG. 1.

FIG. 3 is a top view partially in section of a chain made up of links and a pin as shown in FIG. 1.

FIG. 4 is a side view of the chain shown in FIG. 3.

FIG. 5 is a pin made in accordance with the present invention.

DESCRIPTION OF THE PREFERRED EMBODIMENTS

Figure 6:
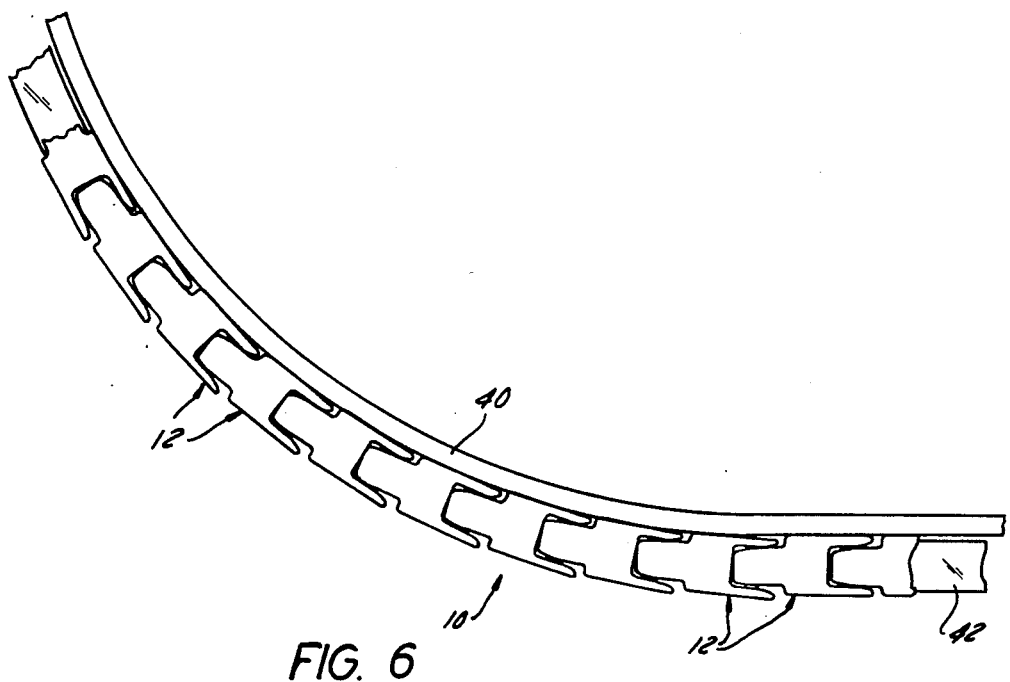
FIG. 6 is a top view of a chain made up of links as shown in FIG. 1; the chain is shown when going around a corner.

FIGS. 1 through 4, 6 and 7 illustrate a chain 10 which is made up of pintle links 12 and pins 14. Each link 12 has a first sidebar 16 and a second sidebar 18. A barrel portion 20 connects the first and second sidebars 16, 18 at a first end 22. The barrel portion 20 has a bore 24 for receiving a pin 14. It will be noted in FIG. 3 that the bore 24 has a small diameter at the center which tapers to a larger diameter at the ends so as to permit the chain 10 to flex laterally. The second ends 26 of the first and second sidebars 16, 18 are spaced wide enough apart to receive the barrel portion 20 of the adjacent link 12. Each sidebar 16, 18 has an aperture 28, 30 near its second end 26. As shown in FIG. 3, a pin 14 is received by the apertures 28, 30 of one link 10 and by the bore 24 of the barrel 20 of the adjacent link 10. The links which are shown herein are links which are molded from a polymeric material.

The pin 12 is substantially cylindrical in shape. The first end 32 of the pin 14 is a noncylindrical, necked-down portion having a D-shaped cross-section. This necked-down end may be formed by milling or by other methods known in the art. The second end 34 of the pin 14 is substantially cylindrically shaped and has a diamond-shaped knurl on its outer surface. The apertures 28, 30 in the first and second sidebars 16, 18 are shaped so as to receive the pin 14. The necked-down end 32 of the pin 14 is small enough to pass through the aperture 30 in the second sidebar 18, and the aperture 28 has a D-shaped cross-section corresponding with the cross-section of the necked-down end 32 so as to receive the end 32 with an interference fit. The aperture 30 in the second sidebar 18 is substantially cylindrical and corresponds in size to the end 34 of the pin 14 so as to receive the end 34 with an interference fit. It can be seen that the flat surface 33 of the end 32 is oriented so that the semicylindrical surface 31 bears against the first sidebar 16 during operation of the chain. The provision of cylindrically-shaped bearing surfaces is preferred, as it means that the force is spread over a larger bearing area, thereby reducing wear. The pin 14 shown here is made of metal. The pin may be made of many materials, including stainless steel or nonmetallic materials in cases in which corrosion resistance is important.

For assembly of the chain, the knuckle portion of the barrel portion 20 of one link 12 is placed between the first and second sidebars 16, 18 of the adjacent link 12 such that the bore 24 is aligned with the apertures 28, 30. The pin 14 is then inserted through the aperture 30, the bore 24, and the aperture 28, until the necked-down portion 32 of the pin 14 bottoms out on the sidebar 16. The two links 12 may then articulate relative to each other about the pin 14 and may articulate laterally relative to each other due to the shape of the bore 24. The noncylindrical shape of the necked-down portion of the pin 14 and the corresponding noncylindrical shape of the aperture 28 act together to prevent the pin 14 from rotating relative to the link 12. If the pin 14 does not rotate relative to the link 12, there is no opportunity for the knurled end 34 to cut into the sidebar 18 and become loose. The fact that the pin 14 has bottomed out on the sidebar 16 also fixes the pin 14 so that it cannot move outward through the aperture 28. The knurled end 34 of the pin 14 serves two functions. First, and most importantly, the knurl resists movement of the pin outward through the aperture 30. Secondly, the knurl resists rotation of the pin 14 relative to the sidebar 18.

The benefits of this assembly of the pin 14 in the links 12 are, first, that the pin 14 is retained in the links 12 and, second, that the pin 14 resists flexing of the sidebars 16, 18 relative to each other. The pin is retained, because the necked-down portion 32 bottoms out on the first sidebar 16 and cannot move further outward through the aperture 28 and because the knurled end 34 resists movement of the pin 14 outward through the aperture 30. The fact that the pin 14 cannot move axially relative to the sidebars 16, 18 and that the pin 14 is fixed to the sidebars 16, 18 also means that the sidebars 16, 18 cannot flex relative to each other.

It will be noted that a substantially flat roof 36 is integral with the first and second sidebars 16, 18. The top of the roof 36 is flush with the top surfaces of the sidebars. The roof 36 is longitudinally spaced from the apertures 28, 30 to permit coupling with an adjacent link, as shown in FIG. 3. The roof 36 is also spaced a distance away from the barrel 20 so as to provide an opening 38 in the top surface of the link 12. The opening 38 provides a place for dirt to pass through the link so that the chain is self-cleaning as it operates. The flat roof 36 serves two primary functions. First, it improves the strength and rigidity of the link 12. Second, it provides a smooth, flat, broad surface area for supporting articles which are carried by the chain 10, thereby providing a more continuous surface for more uniform support, and reducing wear.

In FIG. 5 is shown a second type of pin 14' which can be used in place of the pin 14 which was described earlier. It can be seen that the first end 32' of the pin 14' is necked-down and has a D-shaped cross-section identical to the first end 32 of the pin 14, and the second end 34' of the pin 14' has an annular shaped knurl in its outer surface instead of the diamond shaped knurl of the pin 14. The annular shaped knurl at the end 34' does not prevent the rotation of the pin 14' relative to the sidebar 18; however, that rotation is already prevented by the necked-down portion at the other end 32'. The annular knurl simply serves to prevent movement of the pin 14' along its axis relative to the sidebar 18.

Figure 7:
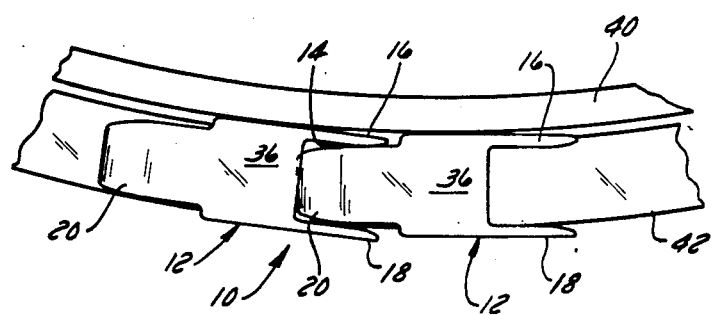
FIG. 7 is an enlarged, broken-away view of the chain shown in FIG. 6.

FIGS. 6 and 7 show the chain 10 articulating around a bend in which there is an inner guide strip 40. The chain is supported on a wear strip 42. It should be noted that the outer edges of the sidebars 16, 18 of each link 12 are shaped such that, when the chain 10 flexes around the bend, the inner sidebar 16 of each link will contact the guide strip 40 at a point on the sidebar which is within the bounds of the roof 36. Because the point of contact with the sidebar is within the bounds of the roof 36, the link is rigid at the point where it contacts the guide strip 40, and thereby the tendency for the sidebars 16, 18 to flex relative to each other is minimized. In the embodiment shown, the point of contact with the inner guide strip is designed to be within the bounds of the roof 36 by making the outer edges of the sidebars 16, 18 straight and parallel to each other from the apertured ends of the sidebars to the end of the roof 36 nearest the barrel 20.

While the aforedescribed embodiments are those which are preferred, other embodiments of the present invention will be obvious to those skilled in the art.

What is claimed is:

1. In a conveyor chain of the type comprising a plurality of pintle links and a plurality of metal pins connecting said links together, each link being of a polymeric material and comprising first and second sidebars and a barrel portion connecting said sidebars at a first end; said barrel portion having a bore for receiving one of said pins; said first and second sidebars having second ends spaced wide enough apart to receive the barrel portion of an adjacent link; each sidebar having an aperture at its second end, such that two adjacent links are pivotally connected by means of one of said pins which is received by the bore in the barrel of one link and by the apertures in the second ends of the sidebars of the other link, the improvement comprising:

the entire length of the aperture through the first sidebar has the same diameter and shape and the entire length of the aperture through the second sidebar has the same diameter and shape such that both sidebars are recess free around the apertures;

each of said pins being substantially cylindrically shaped and having first and second ends which are entirely contained and terminate within the apertures of said first and second sidebars, respectively, whereby smooth link sides are provided without placing the pin ends in sidebar recesses;

said second end of each pin having a knurled outer surface adapted to frictionally engage the surface of said aperture in said second end of said second sidebar to hold said pin against axial movement relative to said first sidebar;

the aperture in the second end of the second sidebar being substantially cylindrical and sized to receive said knurled end of said pin with an interference fit;

the aperture in the second end of the first sidebar having a noncylindrical shape;

the first end of each pin including noncylindrical means having an interference fit in the aperture of the second end of the first sidebar for preventing rotation of the knurled surface of the second end of the pin in the aperture in the second end of the second sidebar and the grinding away of the polymeric material of the second sidebar by the metal knurled surface; and said first sidebar including an inner surface adjacent said aperture in said first sidebar and facing said second sidebar and spaced from said second sidebar, said first end of said pin including a shoulder engageable with said first sidebar inner surface when said first end of said pin is housed in said aperture in said first sidebar.

* * * * *